US008646822B2

(12) United States Patent
Braun et al.

(10) Patent No.: US 8,646,822 B2
(45) Date of Patent: Feb. 11, 2014

(54) APPARATUS AND METHOD FOR MANIPULATING THE WIRE-ENDS OF WIRES

(75) Inventors: Alfred Braun, Cham (CH); Roberto Gasperi, Ebikon (CH)

(73) Assignee: Komax Holding AG, Dierkon (CH)

( * ) Notice: Subject to any disclaimer, the term of this patent is extended or adjusted under 35 U.S.C. 154(b) by 138 days.

(21) Appl. No.: 12/913,889

(22) Filed: Oct. 28, 2010

(65) Prior Publication Data

US 2011/0097185 A1 Apr. 28, 2011

(30) Foreign Application Priority Data

Oct. 28, 2009 (EP) .................................... 09174386

(51) Int. Cl.
*B25J 15/02* (2006.01)

(52) U.S. Cl.
USPC .......................... 294/207; 294/119.1; 269/32

(58) Field of Classification Search
USPC ........................ 294/207, 119.1, 902; 901/37; 269/32–33, 24, 27, 20, 6, 3
See application file for complete search history.

(56) References Cited

U.S. PATENT DOCUMENTS 4,579,380 A * 4/1986 Zaremsky et al. .......... 294/119.1
4,699,414 A * 10/1987 Jones ......................... 294/119.1
4,970,777 A 11/1990 Folk et al.
5,253,912 A * 10/1993 Andorlini et al. .......... 294/119.1
5,257,689 A * 11/1993 Lombardi et al. ......... 198/468.2
5,575,060 A 11/1996 Ohta et al.
8,113,557 B2 * 2/2012 Kirst et al. .................... 294/106
2001/0028175 A1 * 10/2001 Thompson et al. ........ 294/119.1
2002/0144395 A1 10/2002 Soriano
2003/0079342 A1 5/2003 Revel et al.

FOREIGN PATENT DOCUMENTS

EP 0440955 A1 8/1991
EP 0448116 A1 9/1991
EP 0708508 A1 4/1996
WO 03045616 A1 6/2003

* cited by examiner

*Primary Examiner* — Stephen Vu
(74) *Attorney, Agent, or Firm* — Fraser Clemens Martin & Miller LLC; William J. Clemens

(57) ABSTRACT

An apparatus and method for insertion of wire-ends into connector housings includes a wire gripper with two wire-end gripping jaws. The wire gripper has a slider apparatus with a guide element and a slider coupled to the first gripping jaw wherein the first gripping jaw and the slider are borne displaceably relative to the second gripping jaw along the guide element. A pressured actuator acts through a movement converter on the wire gripper to initiate a coarse movement of the first gripping jaw relative to the second gripping jaw and rotating movement of a motor is converted by the movement converter into a fine movement of the first gripping jaw relative to the second gripping jaw.

19 Claims, 4 Drawing Sheets

APPARATUS AND METHOD FOR MANIPULATING THE WIRE-ENDS OF WIRES

FIELD OF THE INVENTION

The invention relates to an apparatus and a method for manipulating the wire-ends of wires. In particular, it relates to the automated insertion into connector housings of end-fitted wire-ends of wires.

BACKGROUND OF THE INVENTION

Wire harnesses, such as are employed, for example, in automobiles or airplanes, consist of a plurality of wires whose wire-ends are inserted into connector housings. For this purpose, the wire-ends, which have been stripped of insulation and fitted with contact parts, are inserted into the chambers of the connector housing. The wire-ends, and in some insertion methods also the contact parts, are usually held and moved with pneumatically actuated grippers. This principle is also similarly employed for the mechanical end-fitting or end-processing of individual wires.

Corresponding insertion methods and robots are known from, for example, patent applications EP0708508-A1 and EP0440955-A1. Patent application EP0708508-A1 describes an insertion unit that is pneumatically operated. Patent application EP0440955-A1 relates to an industrial robot for the automatic assembly of electric conductors with contact parts in connector housings.

Particularly in the case of small connector housings which have small grid-pitches, the known solutions encounter limitations because pneumatic grippers are employed which, on account of their construction, can be either closed or open. In the open state, these pneumatic grippers occupy a relatively large amount of space, and, for example, damage to, or kinking of, adjacent wires can occur.

There is a need to provide an improved wire gripper for manipulating wires. Furthermore, its dimensions must be small, so that, for example, connector housings can be loaded with closely adjacent wire-ends without the occurrence of damage or reciprocal impairment.

SUMMARY OF THE INVENTION

Aspects of the invention relate in particular to a novel wire gripper and an improved manipulating method which is made possible by this wire gripper. In this wire gripper, pressure means act on a movement converter, which sets a first gripping jaw into motion relative to a second gripping jaw, and a motor acts on the movement converter with a rotating motion, which sets the first gripping jaw into motion relative to the second gripping jaw.

An advantage of the invention lies in a combination of high gripping forces at the gripping jaws of the wire gripper through a hydraulically operating or pneumatically operating system with the possibility of stepless opening and closing of the wire gripper by means of an electrically driven motor.

Of great advantage is the compact construction of the wire gripper according to the invention.

The invention enables precise and non-destructive work in housing-insertion also with small grid-pitches by employment of a stepless, controlled movement of the wire gripper.

In a preferred embodiment, the invention enables the insertion into connector housings of wires with small cross sections through repeat-gripping, the respective wire-end being briefly grasped and inserted into the connector housing. The gripper is then moved backwards with released gripper jaws and the wire-end is grasped anew and completely inserted into the connector housing. The danger of faulty insertions, or the danger of kinking at the wire-end, can thereby be markedly reduced.

The invention can also be applied to other manipulations of wires.

DESCRIPTION OF THE DRAWINGS

Details and advantages of the invention are described in detail below in relation to exemplary embodiments and by reference to the drawings.

DESCRIPTION OF PREFERRED EMBODIMENTS

Figure 1:
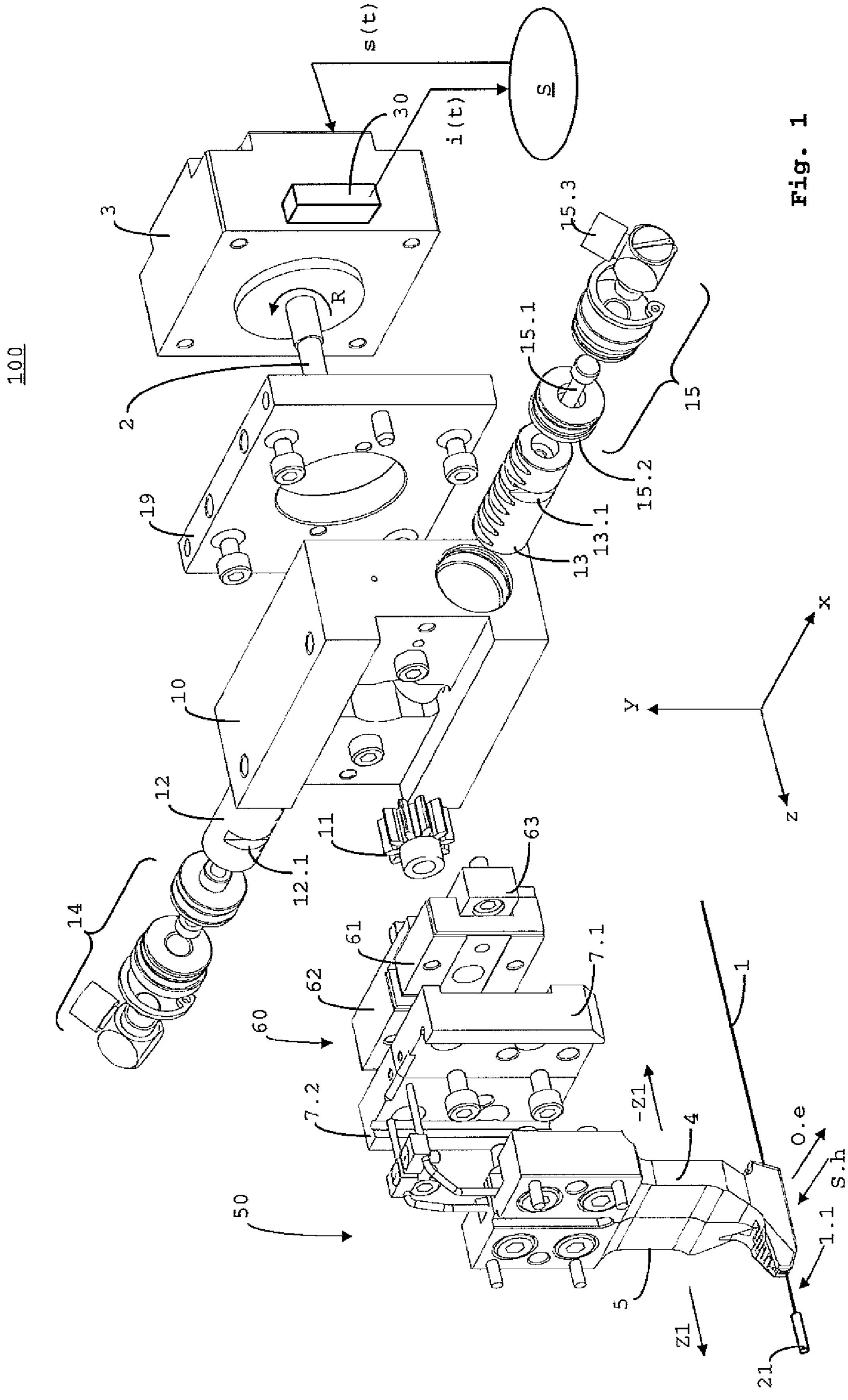
FIG. 1 is an exploded view of an apparatus according to the invention in a first embodiment.

Identical reference characters indicate identical components or identically acting components. Descriptions such as “right”, “left”, “top”, “bottom” relate to the respective arrangement in the figures. The x-y-z-coordinate system that is shown serves only to better explain the individual directions.

The terms “hydraulic means” or “pressure means” are used here for the generic description of pressure actuators that by means of a fluid (e.g. a gas or a liquid) exert pressure on a positioning element (e.g. a piston). Preferably, pneumatic actuators are employed as hydraulic means or pressure means.

A first preferred embodiment is described by reference to FIG. 1. In this figure, an exploded view of an apparatus 100 according to the invention is shown.

It should be noted at the outset that there are two fundamental variants of the apparatus 100 according to the invention. In a first variant, a first gripping jaw (e.g. gripping jaw 4) is moved relative to a second, stationary gripping jaw (e.g. the gripping jaw 5). This means that the opening and closing take place only through a corresponding movement of the first gripping jaw. In a second variant, the first gripping jaw 4 and the second gripping jaw 5 are moved synchronously together.

Ultimately, the purpose of all the embodiments of the invention is the controlled execution of the necessary movements of a wire gripper 50, or of the gripping jaws 4, 5 respectively of the wire gripper 50.

The apparatus 100 according to FIG. 1 is designed for insertion into a connector housing 20 (FIG. 2) of a wire-end 1.1 of a wire 1. It contains the wire gripper 50 with the first gripping jaw 4 and the second gripping jaw 5 to grasp the wire-end 1.1.

FIG. 1 shows the apparatus 100 with synchronously commonly movable gripping jaws 4, 5 (referred to as Variant 2). However, in what follows below, the apparatus 100 with only one single-sidedly movable gripping jaw 4 (referred to as Variant 1) is also described by reference to this FIG. 1.

In Variant 1, hydraulic means (pressure actuator) 15 are employed to close the wire gripper 50. The apparatus 100 also contains a slider apparatus 60 with a guide element 63 (for example, in the form of a guide rail, as shown in FIG. 1, or in the form of a guide groove) and a first slider 61. This first slider 61 is assigned to the first gripping jaw 4, i.e. the first slider 61 is connected mechanically with the first gripping jaw 4. The first gripping jaw 4, along with the assigned first slider 61, is borne movably along the guide element 63 relative to the second gripping jaw 5. The hydraulic means 15 acts via a coupler on the slider apparatus 60 to enable initiation of a coarse closing movement S.h of the first gripping jaw 4 along with the assigned first slider 61 relative to the second gripping jaw 5. In Variant 1, this second gripping jaw 5 does not execute an opening or closing movement.

The apparatus 100 further contains a motor 3. The latter is preferably an electrically operated stepping motor or servo-motor. A so-called movement converter is employed which interacts with the motor 3 in such manner that a rotating movement R of the motor 3 is converted into a fine movement (e.g. a fine opening movement and/or a fine closing movement, depending on the embodiment) of the first gripping jaw 4. In the embodiment shown, the movement converter contains the following elements: a motor shaft 2, a gear wheel 11 (e.g. in the form of a pinion), and a gear rack 13. The rotating movement R of the motor 3 drives the motor shaft 2, on whose end the gear wheel 11 is mounted. This gear wheel 11 engages in the toothing of the gear rack 13. This gear rack 13 is borne movably in a housing (referred to here as "pneumatic closing unit 10"). In the exemplary embodiment shown, the gear wheel 11 is mounted above the gear rack 13. When the motor shaft 2 and the gear wheel 11 move in counterclockwise direction (see the direction arrow of the rotating movement R), the gear rack 13 is moved out of the pneumatic closing unit 10. That is to say, the gear rack 13 moves in a positive x-direction.

This translatory movement of the gear rack 13 is converted into a corresponding translatory movement of the first slider 61. For this purpose, the first slider 61 is motionally connected or coupled with the gear rack 13 via a coupler. In the exemplary embodiment that is shown, a groove 13.1 is provided on the gear rack. For the purpose of providing the motional connection or coupling, a corresponding pin of the slider 61 engages in this groove 13.1. When the gear rack 13 moves in negative x-direction, the slider 61 is also moved along with it in negative x-direction. Other known means can also be employed as the motion converter.

The slider apparatus 60 contains not only the slider 61 and the guide element 63 but also a mechanical movement coupler to the first gripping jaw 4. When the slider 61 is moved in the negative x-direction, the first gripping jaw 4 executes a corresponding translatory closing movement (e.g. the coarse translatory movement S.h) in negative x-direction.

To allow differentiation between the hydraulically originated movement and the motor-originated movement, in what follows hereafter a differentiation is made between a coarse movement and a fine movement. The coarse movement is hydraulically originated, whereas the fine movement is motor-originated. Depending on the embodiment, there can be the following combinations of movements, each of the embodiments having at least one hydraulically originated translatory coarse closing movement S.h and one motor-originated fine opening movement O.e. The corresponding reference characters are constructed as follows: "S" stands for "closing movement", "O" stands for "opening movement", "h" stands for "hydraulic" (or "pneumatic" respectively) and "e" stands for "electric" (in other words, "motor driven").

| Embodiment | S.h | O.h | S.e | O.e |
|---|---|---|---|---|
| 1. | Yes | No | No | Yes |
| 2. | Yes | No | Yes | Yes |
| 3. | Yes | Yes | No | Yes |
| 4. | Yes | Yes | Yes | Yes |

Shown in FIG. 1 are details of the first embodiment shown in the above table. Closing of the gripping jaw(s) 4, 5 takes place hydraulically, and opening electrically. Preferably, the coarse closing movement S.h is executed with greater force than the motor-originated fine opening movement O.e. Through a forceful coarse closing movement S.h, the wire-end 1.1 of the wire 1 can be securely gripped between the gripping jaws 4, 5.

Further preferred details are described below. In the exemplary embodiment that is shown, the wire gripper 50 contains both of the gripping jaws 4, 5. The gripping jaw 4 is rigidly coupled via a first adapter plate 7.1 with the movable slider 61. In the first variant, the second gripping jaw 5 can be connected, either directly or via a second adapter plate 7.2, with a stationary housing or apparatus part (e.g. with the pneumatic closing unit 10), since in Variant 1 this gripping jaw 5 does not have to execute an opening or closing movement.

The guide element 63 (e.g. in the form of a guide rail, as shown in FIG. 1, or in the form of a guide groove) can be rigidly connected with the pneumatic closing unit 10. The electric motor 3 can, for example, be coupled with the pneumatic closing unit 10 via an adapter plate 19. The motor shaft 2 penetrates the pneumatic closing unit 10. Via the first gear rack 13 (in Variant 1), or via two separate gear racks 12, 13 in Variant 2, the gear wheel 11 can move either one slider 61 (in Variant 1) or two sliders 61, 62 (in Variant 2) and thereby move the first gripping jaw 4 or both gripping jaws 4, 5.

In order to be able to overlay the motor-originated fine movement with a coarse hydraulic movement, the first hydraulic means 15 also acts on the first gear rack 13. With a fluid (e.g. compressed air or hydraulic liquid) it is possible, for example, for a piston rod 15.1 to be displaced. This piston rod 15.1 presses with a ram 15.2 against the gear rack 13. The fluid can, for example, be applied via a connector 15.3. If the fluid is applied under pressure to the hydraulic means 15, a hydraulic coarse closing movement S.h is triggered.

Variant 2 of the invention will now be explained below. In this variant, the two gripping jaws 4, 5 are moved synchronously. Variant 2 differs from Variant 1 in that a second hydraulic means (pressure actuator) 14, the second gear rack 12, and the second slider 62 are provided. The manner of functioning of these means 14, 12, and 62 is similar to the manner of functioning of the already described means 15, 13, 61.

By command to the motor 3 (e.g. through a control signal s(t)), the motor shaft 2 can, for example, be moved in the rotational direction R. The gear wheel 11 drives the first gear rack 13 in the x-direction and the second gear rack 12 in the −x-direction. That is to say, both gear racks 12, 13 are moved outwards from the inside of the pneumatic closing unit 10. Via the corresponding coupler (here out of the grooves 12.1 and 13.1 and by corresponding pins on the sliders 61, 62), the two sliders 61, 62 are moved apart. This movement leads to the synchronous fine opening movement O.e of the two gripping jaws 4, 5. During this synchronous fine opening movement O.e, the gripping jaw 4 moves in the x-direction and the gripping jaw 5 in the –x-direction.

The opening movement O.e and the closing movement S.h are employed in all embodiments. During execution of the fine opening movement O.e, the hydraulic means 14, 15 are preferably switched to be pressure-free, so that the motor 3 does not have to perform work against this pressure.

Additionally, in case of need, a coarse opening movement O.h can be laid over, or follow, the fine opening movement O.e. In the corresponding embodiments 3 or 4 (see the table above), the coarse opening movement O.h is triggered by the hydraulic means 14 and 15. For example, an underpressure can be simultaneously applied to the hydraulic means 14, 15 so as to move the gear racks 12, 13 apart. In an advantageous embodiment, which does not operate with underpressure, dual-acting cylinders are employed, to which pressure can be applied from both sides, so as to be able to alternately execute the coarse opening movements O.h as well as the coarse closing movements S.h. The moving apart of the gear racks 12, 13 then leads to a synchronous coarse opening movement O.h of the two gripping jaws 4, 5.

In addition, if required, a fine closing movement S.e can be overlayed with, or preceded by, the coarse closing movement S.h (see the table above, embodiments 1 and 4).

Figure 2:
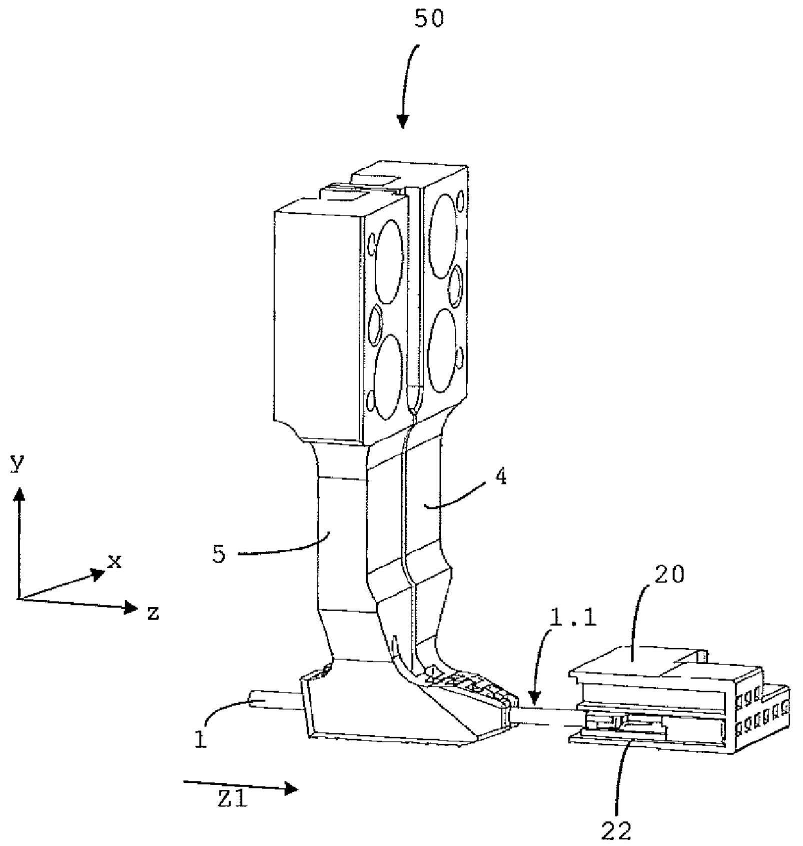
FIG. 2 is a perspective view of a wire gripper of an apparatus according to the invention during insertion of a wire-end into a housing.

Next, shown in FIG. 2 is a perspective view of the wire gripper 50 according to the apparatus 100 of the invention during insertion of the wire-end 1.1 into the housing 20. The latter is preferably a connector housing. The housing 20 is shown in cross-sectional view so as to make visible that the housing 20 has at least one wire channel 22 or one chamber. After the wire gripper 50 has executed a closing movement (e.g. the coarse closing movement S.h) and the wire 1 has been gripped, a common feeding movement Z1 of the first gripping jaw 4 and of the second gripping jaw 5 is executed for the purpose of inserting the wire-end 1.1 of the wire 1 into the wire channel 22 or the chamber of the housing 20. To ensure that during the closing movement the wire 1 is gripped tightly, this closing movement is executed as the coarse closing movement S.h.

Figure 3:
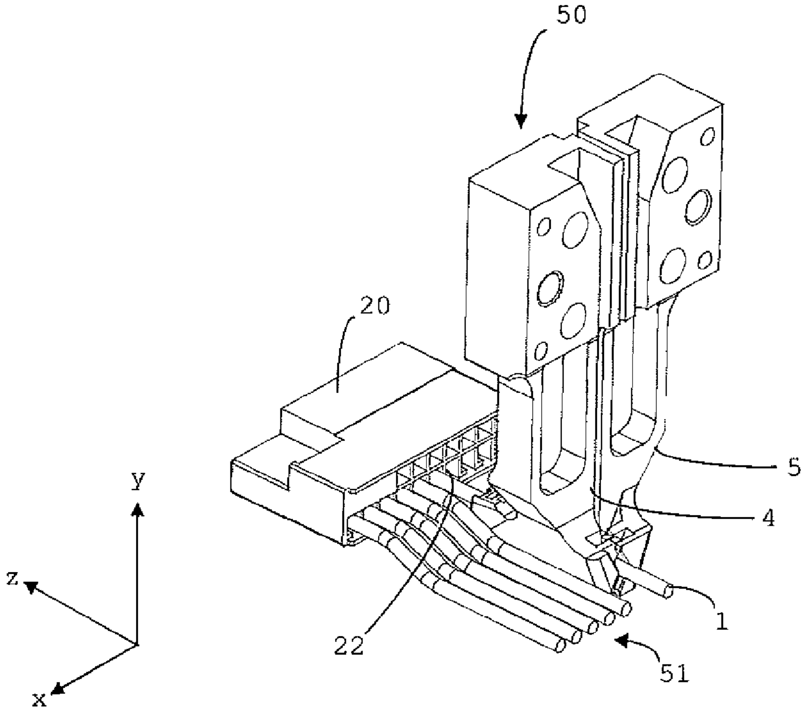
FIG. 3 is a perspective view of a wire-gripper of an apparatus of the invention during insertion of a wire-end of a wire harness into a multi-row housing.

Shown in FIG. 3 is a perspective view of the wire gripper 50 according to the apparatus 100 of the invention during insertion of the wire-end 1.1 of a wire loom 51 into the multi-row housing 20. A plurality of wire-ends 1.1 has already been inserted into the respective wire channels 22 or chambers of the housing 20. In the momentary situation that is shown, the wire-end 1.1 of a further wire 1 is just being inserted into an adjacent wire channel 22.

According to the invention, the gripping jaws 4, 5 taper towards the bottom so as to occupy as little constructional space as possible. Moreover, the wire gripper 50 is designed in such manner as to be capable of executing small fine movements and relatively large coarse movements so as to prevent the wire gripper 50 from, for example, damaging the adjacent wires.

Figure 4:
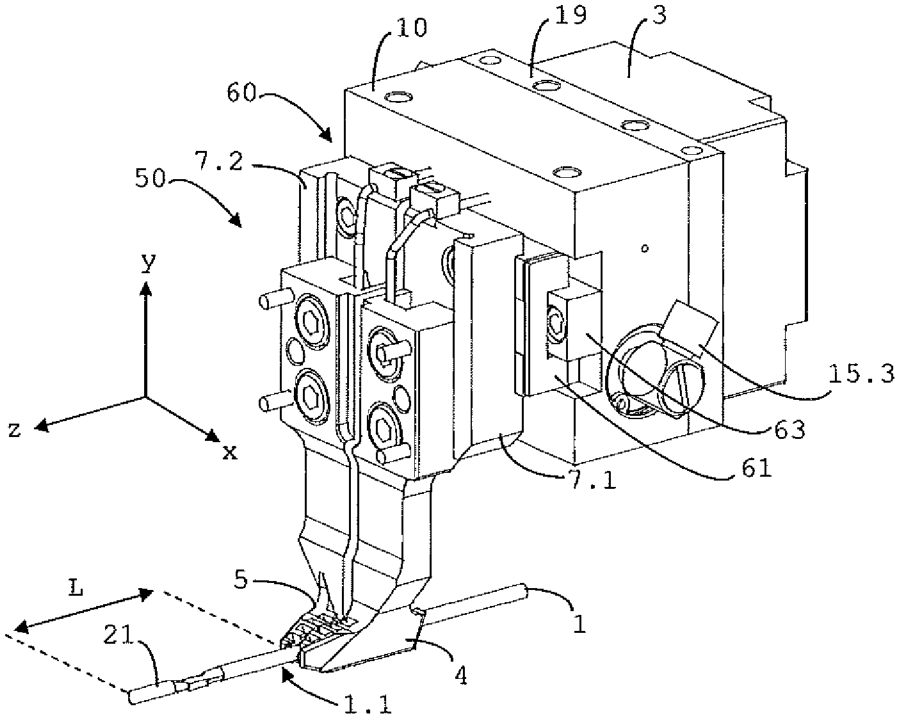
FIG. 4 is a perspective view of a wire-gripper according to the invention and further elements of an apparatus of the invention during manipulation of a wire-end.

Shown in FIG. 4 is a perspective view of the wire-gripper 50 according to the invention and of further elements of the apparatus 100 of the invention during manipulation of the wire-end 1.1. In this figure, the elements of FIG. 1 can be seen in assembled form. For the purpose of explanation, reference should be made to the description of FIG. 1.

In FIGS. 1 and 4, the wire 1 is provided with a sleeve, cap, terminal, or the like. This sleeve, cap, or terminal serves to create an electrical contact between an electrical conductor of the wire 1 and a terminal in the inside of the housing 20. For simplicity, these elements are therefore referred to as "contact 21". The latter are preferably contacts 21 such as are usual in crimp technology. The invention can also be applied to contacts that are connected to the wire 1 by means of ultrasonic-, resistance-, or laser-welding. The invention can also be applied in association with insulation-displacement technology.

In all embodiments, the apparatus 100 can execute at least the following standard functions or methods. When doing so, the gripping jaws 4, 5 can be moved in two ways:

1. Hydraulically: In this case, the closing movement takes place with one single hydraulic coarse closing movement S.h. In this situation, the position of the gripping jaws 4, 5 is not controlled. The gripping force for gripping the wire 1 is determined by the hydraulic pressure. In order to enable a purely hydraulic movement of the elements of the wire gripper 50, either the motor 3 is decoupled (e.g. through a coupling), or the gear wheel 11 is disengaged, or the motor 3 rotates unloaded. The ultimate gripping force is primarily determined by the hydraulic pressure.
2. Electrically: The fine opening movement O.e is executed by the motor 3. In this situation, the position of the gripping jaws 4, 5 is controlled with, for example, an angle sensor that rotates along with the motor 3, and which is here referred to as "controlling means 30" (see FIG. 1), which can be, for example, mounted on the motor 3. Here, the hydraulic means are preferably switched pressure-free.

An insertion process according to the invention preferably proceeds as follows:

Insertion is an operation in which the end-fitted wire 1 is inserted into the housing chamber, or wire channel 22, of the housing 20. In this situation, the wire 1 is held with the wire gripper 50 and pushed into the housing chamber or into the wire channel 22.

A necessary projecting length of wire L (see FIG. 4) must be so long that the wire-end 1.1 or the contact 21 at the wire-end 1.1 can be completely inserted. The longer this projecting length of wire L is, or the thinner and softer a wire is, the greater the risk becomes that the wire 1 kinks during manipulation and insertion. Kinking of the projecting length of wire can, however, also occur if the wire is thin and soft.

In these cases, a repeat-grip method can be employed which is described below. With the repeat-grip method, the risk of kinking can be reduced.

As can be seen in FIG. 3, the housing 20 typically contains a plurality of chambers or wire channels 22. Each chamber or each wire channel 22 has inserted into it the end-fitted wire 1. This has the consequence that adjacent chambers that already contain a wire 1 can hinder the subsequent insertion operation. Also important in this situation is the chamber-pitch or grid-pitch. A small chamber-pitch hinders the wire gripper 50 when the latter executes an opening movement at the end of the insertion operation to release the clamped wire 1. The smaller the chamber-pitch, the less far can the wire gripper 50 open. As a solution according to the invention, the method of "stepwise opening" that is described below is employed. This method is preferred.

In stepwise opening, the opening of the gripping jaws 4, 5 takes place stepwise, so as to avoid collisions with, or damage to, adjacent ones of the wires 1.

Figures 5A, 5B, 5C:
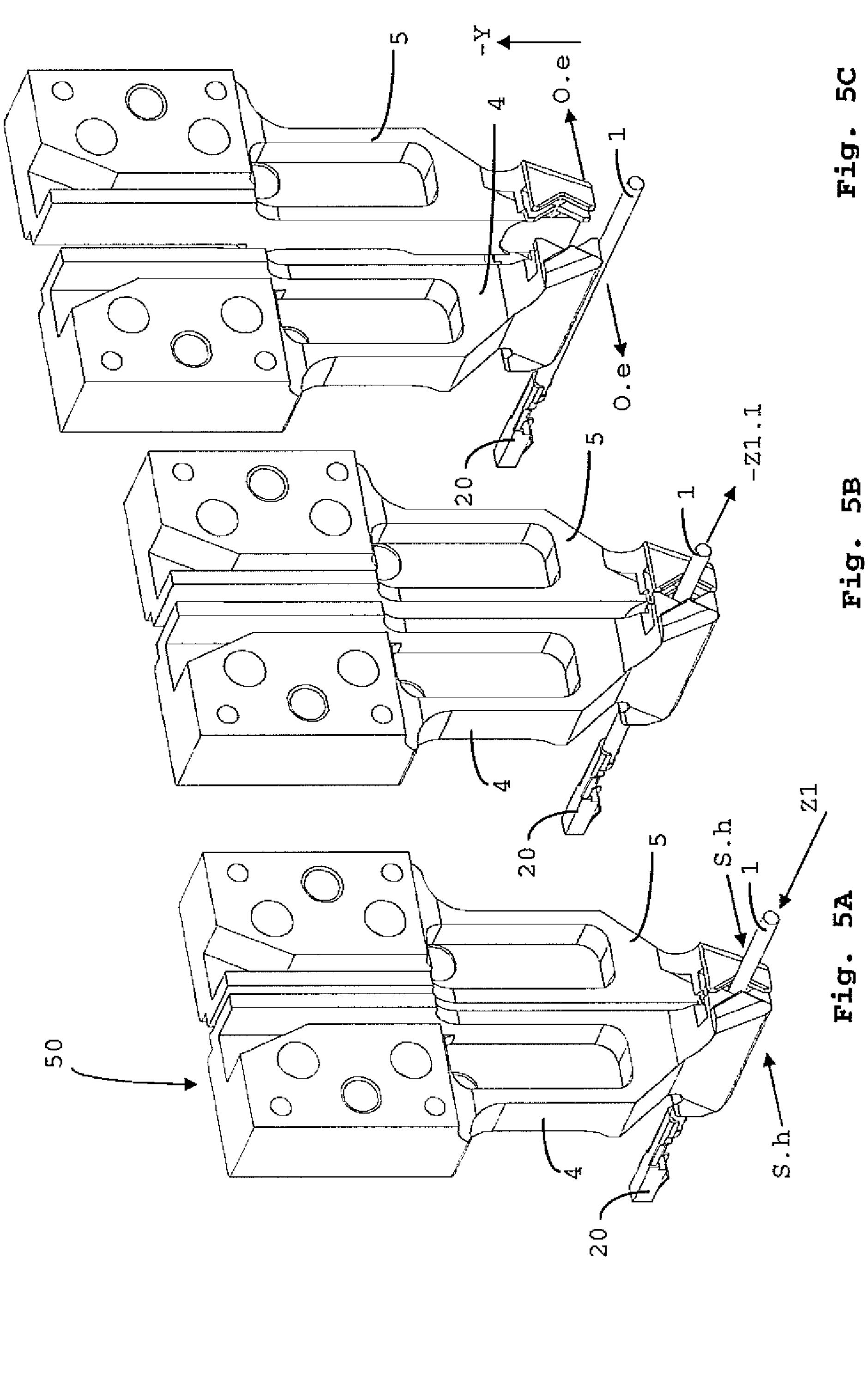
FIG. 5A is a perspective view of a wire-gripper according to the invention during grasping and presentation of a wire-end.
FIG. 5B is a perspective view of the wire-gripper according to the invention as shown in FIG. 5A during execution of a short retreating movement.
FIG. 5C is a perspective view of the wire-gripper according to the invention as shown in FIG. 5A during execution of a retreating movement.

In a first step, the wire 1 is hydraulically gripped in a corresponding coarse closing movement S.h. This step is shown in FIG. 5A. After the wire 1 has been hydraulically gripped, the wire gripper 50 can execute the feeding movement Z1 so as to push the wire-end 1.1 with the contact 21 into the housing 20. There, the contact 21 engages, or the contact 21 can be soldered or adhesively bonded.

In a second step, after completion of the insertion operation (Step 1), the wire gripper 50 is opened (Step 2) only so far that the wire 1 is no longer gripped. That is to say, the gripping is released by an opening movement O.e. This opening movement O.e takes place as a motor-driven movement with employment of the motor 3.

In a third step, the wire gripper 50 is moved in the direction of the wire (i.e. in the –z-direction) away from the housing 20. The third step is shown in FIG. 5B. In FIG. 5B it can be seen that the gripper jaws 4, 5 have been moved slightly apart and that a short translatory retreating movement –Z1.1 has been executed.

In Step 4 the wire gripper 50 is completely opened so that the latter can travel vertically as shown in FIG. 5C. Here, (depending on the embodiment), the opening can be effected by the motor 3 and/or hydraulically. A fine opening movement O.e is preferred. Also here, the vertical movement is referred to as "common retreating movement –Y". The common retreating movement can display a movement component in the direction of the negative z-axis and in the direction of the negative y-axis.

The repeat-grip method is explained as follows. It is employed when the projecting length of the wire L that is necessary for complete insertion into the housing 20 is too long, because in this case, as a consequence of the insertion forces, the wire 1 can kink. This is particularly possible with thin, flexible wires 1, or with the use of so-called gel housings which have a sealing mat that is provided with small pass-through holes.

To prevent kinking, the repeat-grip method is employed. In this situation, the projecting length of wire L is reduced to such an extent that kinking is prevented.

In a first step, the wire is gripped hydraulically with shortened projecting length of wire L1 (with L1<L) through execution of a corresponding coarse closing movement S.h.

In a second step, the wire 1 is inserted as far as possible into the housing 20 by a feeding movement.

In a third step, the wire gripper 50 is opened by an opening movement O.e so far that the wire 1 is no longer gripped. In other words, the grip is released.

Then, in a fourth step 4, the wire gripper 50 is moved a small distance in the direction of the wire (i.e. in negative z-direction) away from the housing 20.

In a fifth step, the wire 1 is again gripped hydraulically through a corresponding coarse closing movement S.h being executed and the second step being repeated.

If necessary, steps 2 to 5 are executed several times.

In a preferred embodiment of the invention, (here referred to as Variant 2), the two gripping jaws 4, 5 are moved synchronously.

Preferably, for the purpose of determining the current position of the first gripping jaw 4 and of the second gripping jaw 5, the controlling means 30 (e.g. an angle decoder or position encoder) is employed. A control S (FIG. 1), which receives the information i(t) from the controlling means 30, regulates the actuation of the motor 3, or of the described motor-driven movement operations O.e and/or S.e respectively.

The said movements in x-, y-, and z-direction can be executed by usual drive systems. In particular, servomotors can be employed as drive systems.

All control operations of the various embodiments are preferably connected together via a microprocessor control and are programmable. In FIG. 1, the microprocessor control is symbolized by the control S.

The described combination of a hydraulic drive with an electric drive can also be realized with other gripper mechanisms, which dispense with a linear (slider) guide for the gripping jaws 4, 5. In this case, the gripping jaws 4, 5 can be borne, for example, swivelably or rotatably (instead of linearly displaceably).

The present invention can execute the fully automatic insertion of single-row or multi-row (connector) housings 20, irrespective of whether in crimp, insulation-displacement, solder, ultrasonic, resistance-welding, or laser-welding technology, for example at the end of a wire-processing line. The present invention can, however, also be employed for other manipulations of wires.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for manipulating a wire-end of a wire and including a wire gripper, comprising:

a first gripping jaw and a second gripping jaw for cooperatively gripping the wire-end;

a pressure actuator responsive to pressured fluid for actuating the wire gripper, said pressure actuator acting with a linear movement on a movement converter which sets said first gripping jaw in motion relative to said second gripping jaw; and a motor acting with a rotating movement on said movement converter, which sets said first gripping jaw in motion relative to said second gripping jaw, said pressure actuator and said motor acting separately on said movement converter.

2. The apparatus according to claim 1 wherein said pressure actuator acts through said movement converter on the wire gripper to initiate a coarse movement of said first gripping jaw relative to said second gripping jaw, and said motor acts on the wire gripper through said movement converter to initiate a fine movement of said first gripper jaw relative to said second gripper jaw.

3. The apparatus according to claim 2 wherein said second gripping jaw rests while said first gripping jaw executes the coarse movement or the fine movement.

4. The apparatus according to claim 2 wherein the wire gripper includes a slider apparatus having a guide element and a first slider, said first slider being coupled to said first gripping jaw, wherein said first gripping jaw along with said slider are borne displaceably relative to said second gripping jaw along said guide element, and wherein said pressure actuator acts on said slider apparatus to initiate the coarse movement of said first gripping jaw relative to said second gripping jaw.

5. The apparatus according to claim 4 wherein said slider apparatus includes a second slider which is borne displaceably relative to said first slider, whereby said first and second sliders open to move said first and second gripping jaws away from each other and close to move said first and second gripping jaws towards each other.

6. The apparatus according to claim 2 wherein said movement converter converts the rotating movement of said motor into the fine movement, the fine movement being a translatory fine movement.

7. The apparatus according to claim 1 wherein action of said pressure actuator on the wire gripper generates a relative coarse movement of said first gripping jaw and said second gripping jaw, wherein interaction of said movement converter with said motor generates a relative fine movement of said first gripping jaw and said second gripping jaw.

8. An apparatus for manipulating a wire-end of a wire and including a wire gripper, comprising:

a first gripping jaw and a second gripping jaw for cooperatively gripping the wire-end;

a pressure actuator responsive to pressured fluid for actuating the wire gripper, said pressure actuator acting with a linear movement on a movement converter which generates a coarse movement of at least one of said first gripping jaw and said second gripping jaw relative to one another; and a motor acting with a rotating movement on said movement converter which generates a fine movement of at least one of said first gripping jaw and said second gripping jaw relative to one another.

9. The apparatus according to claim 8 wherein said second gripping jaw rests while said first gripping jaw executes the coarse movement or the fine movement.

10. The apparatus according to claim 8 wherein the wire gripper includes a slider apparatus having a guide element and a first slider, said first slider being coupled to said first gripping jaw, wherein said first gripping jaw along with said slider are borne displaceably relative to said second gripping jaw along said guide element, and wherein said pressure actuator acts on said slider apparatus to initiate the coarse movement of said first gripping jaw relative to said second gripping jaw.

11. The apparatus according to claim 10 wherein said slider apparatus includes a second slider which is borne displaceably relative to said first slider, whereby said first and second sliders open to move said first and second gripping jaws away from each other and close to move said first and second gripping jaws towards each other.

12. The apparatus according to claim 8 wherein said movement converter converts the rotating movement of said motor into the fine movement, the fine movement being a translatory fine movement.

13. The apparatus according to claim 8 wherein action of said pressure actuator on the wire gripper generates a simultaneous relative coarse movement of said first gripping jaw and said second gripping jaw, wherein interaction of said movement converter with said motor generates a simultaneous relative fine movement of said first gripping jaw and said second gripping jaw.

14. An apparatus for manipulating a wire-end of a wire and including a wire gripper, comprising:

a first gripping jaw and a second gripping jaw for cooperatively gripping the wire-end;

a pressure actuator for actuating the wire gripper, said pressure actuator acting with a linear movement on a movement converter which sets said first gripping jaw in motion relative to said second gripping jaw; and a motor acting with a rotating movement on said movement converter setting said first gripping jaw in motion relative to said second gripping jaw wherein said pressure actuator acts through said movement converter on the wire gripper to initiate a coarse movement of said first gripping jaw relative to said second gripping jaw, and said motor acts on the wire gripper through said movement converter to initiate a fine movement of said first gripper jaw relative to said second gripper jaw.

15. The apparatus according to claim 14 wherein said second gripping jaw rests while said first gripping jaw executes the coarse movement or the fine movement.

16. The apparatus according to claim 14 wherein the wire gripper includes a slider apparatus having a guide element and a first slider, said first slider being coupled to said first gripping jaw, wherein said first gripping jaw along with said slider are borne displaceably relative to said second gripping jaw along said guide element, and wherein said pressure actuator acts on said slider apparatus to initiate the coarse movement of said first gripping jaw relative to said second gripping jaw.

17. The apparatus according to claim 16 wherein said slider apparatus includes a second slider which is borne displaceably relative to said first slider, whereby said first and second sliders open to move said first and second gripping jaws away from each other and close to move said first and second gripping jaws towards each other.

18. The apparatus according to claim 14 wherein said movement converter converts the rotating movement of said motor into the fine movement, the fine movement being a translatory fine movement.

19. The apparatus according to claim 14 wherein action of said pressure actuator on the wire gripper generates a relative coarse movement of said first gripping jaw and said second gripping jaw, wherein interaction of said movement converter with said motor generates a relative fine movement of said first gripping jaw and said second gripping jaw.

* * * * *